United States Patent [19]

Vaughen

[11] Patent Number: 4,789,305

[45] Date of Patent: Dec. 6, 1988

[54] SELF-FEATHERING ROTARY WING

[76] Inventor: Jack F. Vaughen, 26807 Spring Creek Rd., Rancho Palos Verdes, Calif. 90274

[21] Appl. No.: 45,893

[22] Filed: May 4, 1987

Related U.S. Application Data

[63] Continuation-in-part of Ser. No. 727,785, Apr. 26, 1985, abandoned, which is a continuation-in-part of Ser. No. 919,646, Oct. 16, 1986, abandoned.

[51] Int. Cl.$^4$ ............................................. B64C 27/46
[52] U.S. Cl. .................... 416/131; 416/138; 416/144; 416/226; 416/DIG. 2; 416/114
[58] Field of Search ............ 416/102, 131, 131 A, 416/138 A, 140 A, 144, 148, 223 R, 226, DIG. 2, 23-24, 237 A, 228 A, 114

[56] References Cited

U.S. PATENT DOCUMENTS

| | | | |
|---|---|---|---|
| 1,692,081 | 11/1928 | De La Cierva | 416/131 A |
| 2,115,754 | 5/1938 | Vaughn | 416/140 A X |
| 2,642,143 | 6/1953 | Miller | 416/24 |
| 2,669,313 | 2/1954 | Lightfoot | 416/DIG. 2 X |
| 2,754,915 | 7/1956 | Echeverria | 416/226 |
| 2,757,745 | 8/1956 | Verhage et al. | 416/24 |
| 3,952,601 | 4/1976 | Galli et al. | 416/144 X |
| 4,130,377 | 12/1978 | Blackwell | 416/138 A X |
| 4,142,837 | 3/1979 | de Simone | 416/223 R |
| 4,514,143 | 4/1985 | Campbell | 416/23 |

Primary Examiner—Everette A. Powell, Jr.

[57] ABSTRACT

A controllable lifting rotary wing for an aircraft wherein each rotor blade is mounted in such a manner that it has freedom to oscillate in pitch about its feathering axis. The aerodynamic center on each rotor blade is displaced forward of this feathering axis over at least a portion of the span. Cyclic aerodynamic forces on this spanwise portion cause the blade to change pitch sinusoidally once-per-revolution of the rotor whenever the rotary wing aircraft experiences a change in flight attitude or velocity. The result is that the rotor blades automatically and continuously change pitch to cancel out cyclic lateral flapping moments which are normally produced on a helicopter rotor blade by such a flight disturbance. This rotary wing has greatly improved stability by virtue of this self-feathering action. Cyclic pitch control moments are applied to the rotor blades by indirect means which do not interfere with automatic blade feathering. Means for control of collective pitch of the blades are also provided.

42 Claims, 10 Drawing Sheets

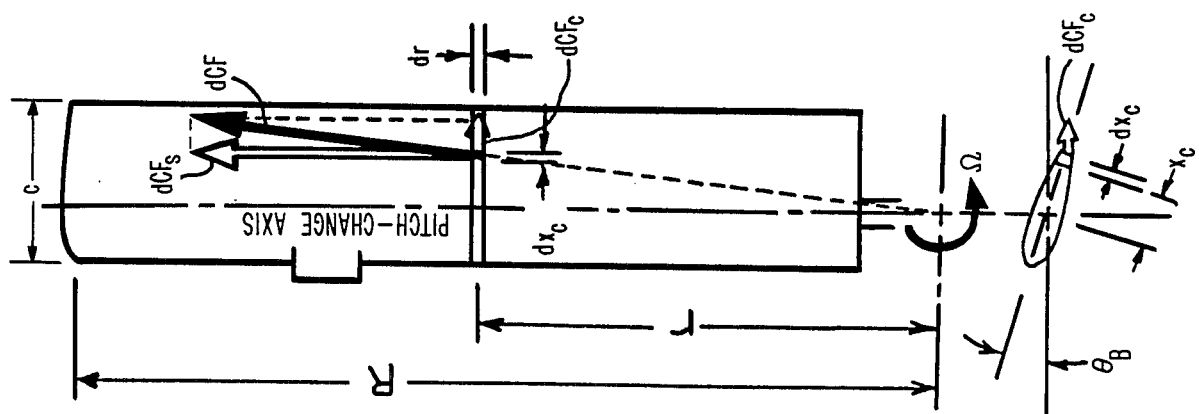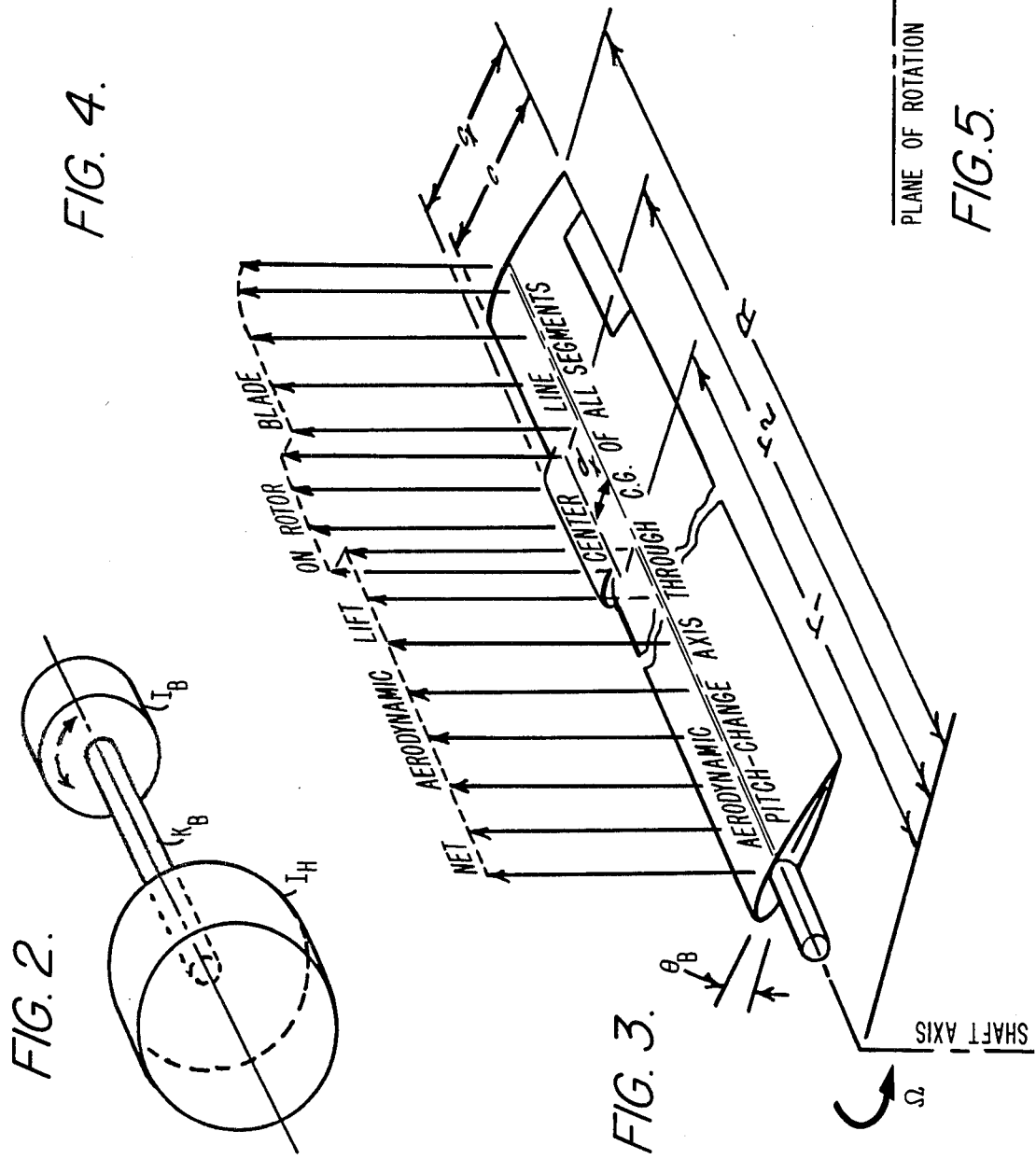

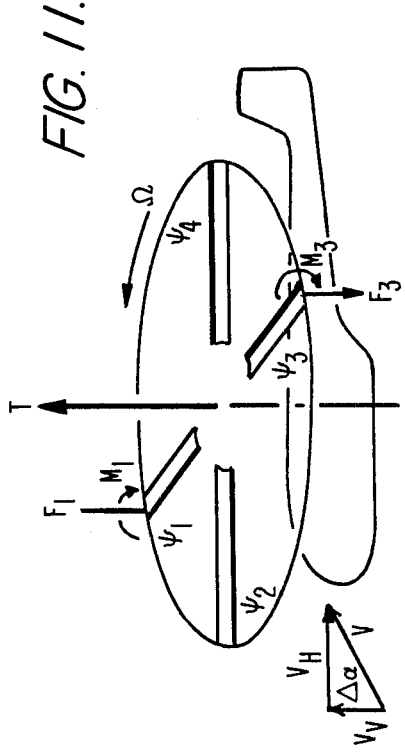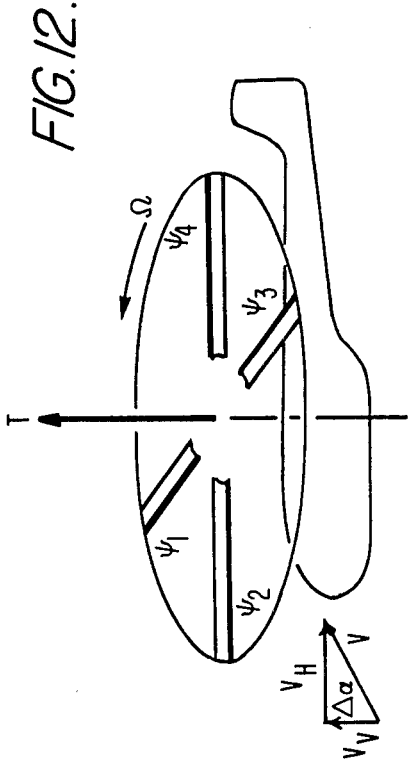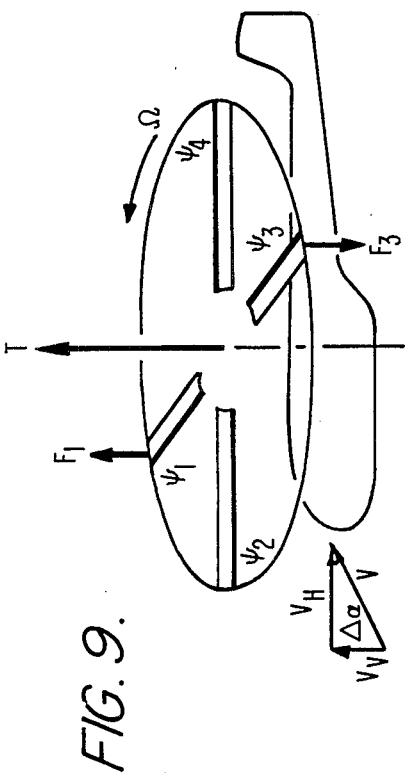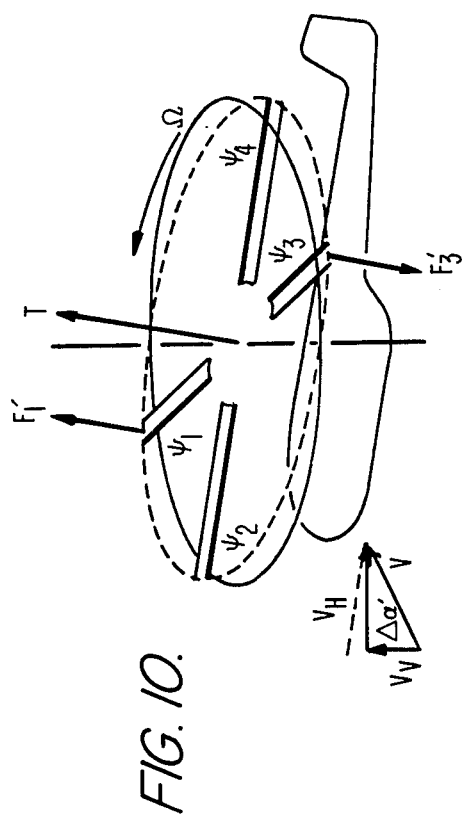

SELF-FEATHERING ROTARY WING

This application is a continuation-in-part of application Ser. No. 727,785 filed Apr. 26, 1985, now abandoned, which was the parent of continuation-in-part application Ser. No. 919,646 filed Oct. 16, 1986, now abandoned.

BACKGROUND OF THE INVENTION

This invention relates to improvements in lifting rotors for helicopters and other rotary wing aircraft. Two persistent problems with prior art rotary wings which are overcome by this invention are mechanical complexity and poor flying qualities.

Conventional rotary wing aircraft are dynamically unstable in flight. Therefore if a conventional rotary wing aircraft experiences a flight disturbance, such as a gust of wind for example, the rotor will react in such a manner that the upsetting effect of the original disturbance is magnified. The usual result is a dynamic pitching or rolling oscillation of the aircraft which will increase in severity unless corrective action is taken by the pilot. This undesirable characteristic of conventional rotary wing aircraft makes them much more difficult to fly than fixed wing aircraft. The constant attention required from the pilot, particularly during hovering flight, makes conventional rotary wing aircraft virtually unsafe to fly at all under instrument flight conditions unless they are equipped with auxiliary stabilizing devices.

A number of such devices have been developed to counteract the instability of conventional rotary wing aircraft. These include gyro-stabilized electro-mechanical autopilots and direct-acting mechanical gyroscopic devices for example. These devices provide artificial pitch and roll damping which reduces the dynamic instability of the conventional rotary wing. However, electro-mechanical autopilots are expensive and complex while direct-acting mechanical gyroscopic devices are heavy and usually increase the aerodynamic drag of the rotary wing adversely affecting its flight performance. It is apparent, therefore, that it is desirable to have an inherently stable lifting rotor which eliminates the need for these stabilizing devices.

The general object of the present invention is to solve the stability problem of conventional rotary wing aircraft as well as certain other problems related thereto while providing a mechanically simple, aerodynamically clean rotary wing.

SUMMARY OF THE INVENTION

The invention teaches that the fundamental cause of instability in conventional aerodynamic lifting rotors is the cyclic lateral flapping moment which develops on a conventional rotor blade whenever the aircraft experiences a change in flight attitude or velocity. These lateral flapping moments produce cyclic longitudinal flapping displacements of the rotor blades which result in a general longitudinal tilt of the rotor tip-path plane relative to the remainder of the aircraft. Since overall thrust remains essentially perpendicular to this rotor tip-path plane, this longitudinal tilt of the rotor plane produces a horizontal component of rotor thrust which in turn leads to dynamically unstable oscillations of the rotary wing aircraft in flight unless corrective action is taken by the pilot.

In this invention, this dynamic instability is avoided because the cyclic lateral flapping moment which would occur on a conventional rotor blade is immediately neutralized by automatic cyclic feathering of the blades as the rotor turns. In the self-feathering rotary wing the blades automatically and continuously compensate for changing flight conditions which tend to produce cyclic lateral flapping moments. Therefore, each blade senses assymetric aerodynamic forces and automatically applies corrective cyclic changes in blade pitch.

These improved stability characteristics are accomplished in the rotary wing of this invention by providing a spanwise portion of the rotor blade in which the aerodynamic center lies forward of the blade pitch-change axis. The physical dimensions of this spanwise portion are chosen in combination with the feathering moment of inertia of the blade to produce a blade whose feathering natural frequency is less than rotational frequency of the rotor at all flight altitudes. However, since the blades are subjected to cyclic disturbances which repeat once per revolution of the rotor, the blades are forced to oscillate at rotor frequency. These cyclic feathering moments which are developed on the blades of the self-feathering rotor produce corresponding cyclic feathering displacements of the blades. The net result is that these cyclic feathering displacements effectively neutralize the initial lateral aerodynamic flapping moments. The self-feathering rotor therefore tends to continue rotating in its original plane.

In the self-feathering rotary wing of this invention means are provided for the pilot to control collective pitch of the rotor blades. However, these control means allow the blades freedom to feather cyclically under influence of the factors previously described. Pilot control of cyclic pitch is also accomplished in the invention by control means which do not interfere with the automatic feathering action.

In summary, the lifting rotary wing which constitutes this invention provides automatic self-feathering action which can be biased by pilot control inputs. This makes possible a mechanically simple, aerodynamically clean lifting rotor with improved flight stability. This flight stability increases all-weather instrument flight safety of any rotary wing aircraft using the self-feathering rotor. These rotors can be manufactured in any required size with the blades having any degree of planform taper or spanwise twist which is required to provide optimum aerodynamic performance. The self-feathering rotary wing can be applied to rotary wing aircraft having a single rotor, coaxial rotors, intermeshing rotors, lateral twin rotors or tandem rotors.

BRIEF DESCRIPTION OF THE DRAWINGS

In the drawings, which are to be regarded as merely illustrative;

FIG. 2 is a schematic perspective view of a dynamic model which represents one rotor blade of the self-feathering rotary wing attached to the remainder of the rotary wing aircraft;

FIG. 3 is a schematic perspective view of one blade of the self-feathering rotary wing;

FIG. 4 is a schematic plan view of one blade of the self-feathering rotary wing;

FIG. 5 is a schematic profile cross-sectional view of one blade of the self-feathering rotary wing;

FIG. 9 is a schematic perspective view of a conventional rotary wing aircraft in equilibrium hovering flight at the instant when an aerodynamic disturbance occurs;

FIG. 10 is a schematic perspective view of the conventional rotary wing aircraft a short period of time after the aerodynamic disturbance occurs;

FIG. 11 is a schematic perspective view of a helicopter fitted with the self-feathering rotary wing in equilibrium hovering flight at the instant when an aerodynamic disturbance occurs;

FIG. 12 is a schematic perspective view of the helicopter fitted with the self-feathering rotary wing a short period of time after the aerodynamic disturbance occurs;

DESCRIPTION OF THE INVENTION

Figure 1:
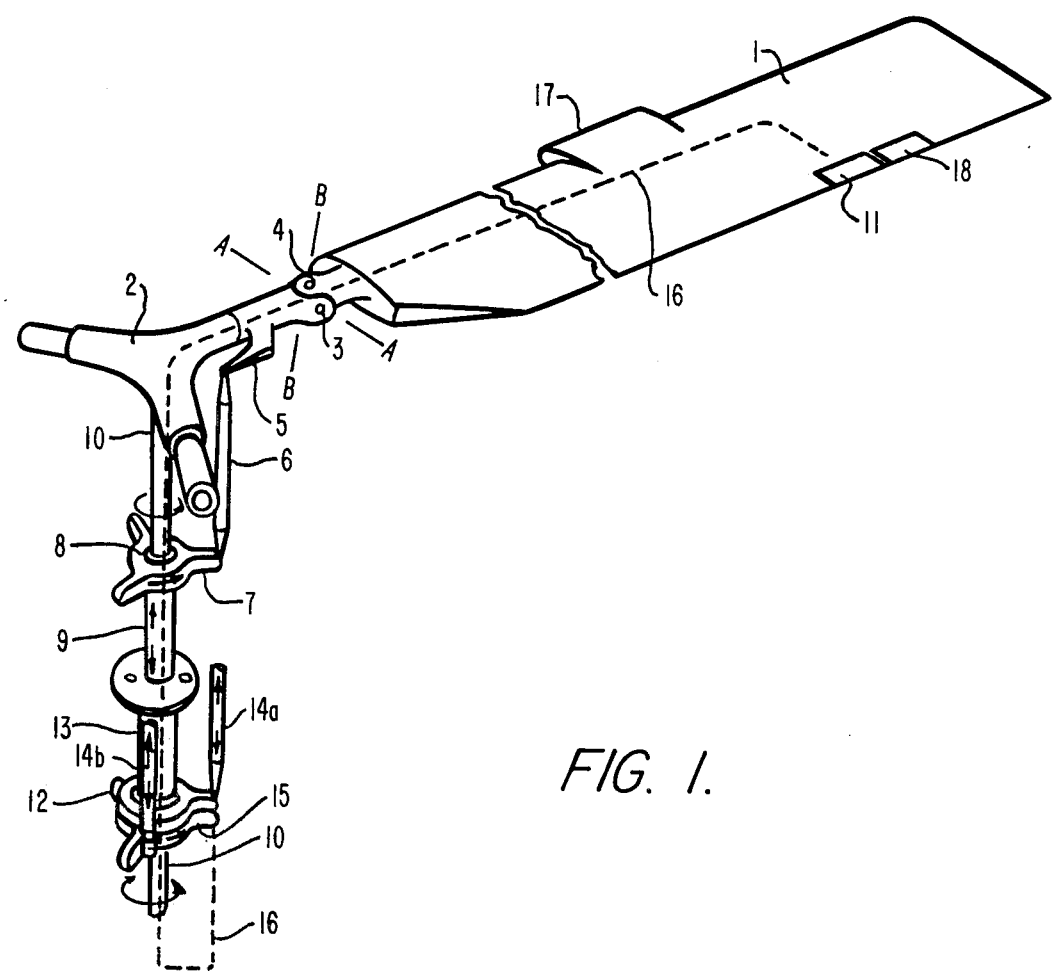
FIG. 1 is a pictorial view of the self-feathering rotary wing with cyclic pitch control provided by an aileron mounted on the trailing edge of each blade.

The self-feathering rotary wing is shown in FIG. 1. This rotary wing operates in the shaded regions of FIGS. 6 and 7 where rotor speed is higher than natural frequency of rotor blade feathering. Cyclic pitch is controlled by ailerons mounted on the trailing edges of the rotor blades. This rotary wing may consist of any number of lifting rotor blades 1 attached to a common central hub 2. In FIG. 1 a three-blade rotor is shown with two blades removed for clarity of illustration. Each blade may be attached to its hub arm by mutually perpendicular flapping hinges 3 and 4. As shown, hinge 3 has an essentially chordwise axis A—A to allow beamwise flapping of the blade relative to the hub. Hinge 4 has an axis B—B which is approximately parallel to the rotor shaft and allows chordwise flapping of the blade. One or both of these hinges may be fitted with mechanical dampers if desired. For example, dampers are usually installed on the lag hinge axis B—B to prevent the phenomenon known as "ground resonance". Also, in the self-feathering rotary wing of this invention, dampers may be installed on the flapping hinge axis A—A to alter the dynamic characteristics of the aircraft. These dampers produce a restraining moment on blade flapping which is proportional to blade flapping velocity.

The characteristic motion of a helicopter fitted with the self-feathering rotary wing typically consists of a neutrally damped long period motion in combination with a small amplitude short period motion. Damping of this short period motion can be increased by adding dampers to the hinges which allow beamwise flapping of the rotor blades. Also, it should be noted in FIG. 8 that with a fixed value of average control aileron deflection, the variation in velocity control sensitivity with changes in flight altitude is much less when flapping hinge damping is employed ($c_f = -1,300$) than it is when no flapping hinge damping is used ($c_f = 0$).

The flapping hinges of the self-feathering rotary wing are preferably offset some distance from the center of the rotor hub as shown in FIG. 1 to amplify hub moments arising from blade flapping. However, the flapping hinges can be placed at the hub center as is done with so-called "teetering rotors" if desired. On the other hand, the mechanical hinges 3 and 4 can be omitted entirely to produce a hingeless or so-called "rigid" rotor. In such a rotor, beamwise flapping is effectively provided by structural flexing of the rotor blade and damping is provided by structural damping within the blade. Such a hingeless rotor is therefore dynamically equivalent to the articulated rotor shown in FIG. 1.

In the self-feathering rotary wing the feathering axis of each hub arm coincides with the quarter-chord line of the blade so that the blade changes pitch about its quarter-chord line. To allow each blade to change pitch relative to the hub, each blade is mounted to its corresponding hub arm by thrust bearing means. To control pitch angle of all rotor blades collectively, a pitch control horn 5 is mounted to each blade root extension. Pin-ended pitch links 6 are connected by universal bearing means to pitch horns 5 and to radial arms of swashplate 7. The lengths of these pitch links are typically adjustable to effect blade tracking. The collective control swashplate 7 is driven to rotate with the rotor shaft as shown by the curved arrow but it is universally mounted through spherical bearing 8 to a non-rotating tube 9 which is coaxial with rotor shaft 10. This non-rotating tube can be moved axially along the rotor shaft as indicated by the arrows. The axial position of this sliding collective pitch control tube is set by the pilot through a conventional collective pitch control mechanism (not shown in FIG. 1). When this slidable tube is moved axially as shown by the arrows, this motion is transmitted through the collective pitch swashplate to cause all blades to change pitch collectively. On the other hand, since the collective pitch control swashplate 7 is universally mounted, the blades are free to change pitch cyclically once per revolution of the rotor relative to the average pitch setting established by the collective pitch control mechanism.

Cyclic pitch of the self-feathering rotor blades in FIG. 1 is controlled by ailerons 11 mounted on the trailing edges of the blades. Cyclic deflection of these ailerons is controlled by a second swashplate bearing assembly. The non-rotating portion 12 of this swashplate is universally mounted to a fixed tube 13 which is coaxial with rotor shaft 10. This swashplate therefore has no axial movement but it can be tilted in any direction by pilot-actuated control links 14a and 14b. These control links are connected to a conventional cyclic pitch control mechanism (not shown in FIG. 1). The rotating portion 15 of this cyclic control swashplate is driven to rotate with the rotor driveshaft as shown by the curved arrow to cyclically control the deflection of ailerons 11 which are mounted on rotor blades 1. Each aileron is connected to one arm of the cyclic control swashplate by a conventional push-pull control assembly which is represented schematically in FIG. 1 by dashed line 16. If desired, the length of this push-pull control assembly can be adjusted to set the average incidence angle of the control aileron relative to the blade.

It should be noted that each blade 1 of the self-feathering rotary wing shown in FIG. 1 is fitted with a fixed leading edge extension 17 over a portion of its span. This extension makes the chordwidth of the blade wider in this section than in the rest of the blade and therefore places the aerodynamic center in this section forward of the quarter-chord line of the rest of the blade. This construction produces important stability effects as will be described.

A conventional lifting rotor blade is typically designed with the aerodynamic centers and centers of gravity of all spanwise blade segments coinciding and falling on the spanwise feathering axis of the blade. If such a blade is given freedom to change pitch about this featuring axis, a restoring feathering spring moment develops whenever the blade has a finite pitch angle. This feathering spring moment results from chordwise components of centrifugal force on the blade elements which arise whenever the blade is not rotating in flat pitch.

This effective feathering spring rate of a rotor blade can be modified by displacing the center of aerodynamic lift in the chordwise direction relative to the feathering axis. For example, in a rotor blade which is free to change pitch relative to the rotor hub, if the center of aerodynamic lift is located forward of the feathering axis over a portion of the blade span, the effective feathering spring rate is reduced and the natural feathering frequency of the rotor blade will be less than the rotational frequency of the rotor.

FIG. 2 shows a dynamic model of a helicopter. In that figure, the larger cylindrical portion represents the moment of inertia $I_H$ of the helicopter (less blades) as measured about the feathering axis of one rotor blade. The smaller cylindrical portion represents the moment of inertia $I_B$ of one rotor blade as measured about its own feathering axis. The rodlike element that connects $I_H$ and $I_B$ together represents the effective torsional spring which connects the blade to the rotor hub of the helicopter. The spring constant $K_B$ of this effective spring tends to resist feathering displacements of the blade relative to the rotor hub. Since the moment of inertia of the helicopter is much larger than moment of inertia of the blade, a torsional dynamic system like that shown in FIG. 2 may be considered to have a single degree of freedom with the blade free to oscillate about the blade feathering axis. The blade therefore has a single natural frequency in oscillation about its feathering axis given by the equation $$\omega_n \approx \sqrt{\frac{K_B}{I_B}}$$

In this equation, $I_B$ is the physical moment of inertia of the rotor blade measured about its feathering axis. The effective spring constant $K_B$ is comprised of two effects. Aerodynamic lift on the wide chord portion of the rotor blade produces a feathering moment which is proportional to blade feathering angle. This is a divergent moment because the aerodynamic center of the wide chord portion lies forward of the blade feathering axis. On the other hand, chordwise components of centrifugal force on the rotor blade produce a restoring feathering moment which is proportional to blade feathering angle.

The aerodynamic feathering moment can be derived by reference to FIG. 3. If the blade has an instantaneous feathering angle $\theta_B$ relative to the plane which is perpendicular to the rotor shaft, aerodynamic lift will be developed along the blade's aerodynamic center line as indicated by the vectors. Throughout most of the blade span this aerodynamic center line coincides with the blade pitch-change axis which passes through the centers of gravity of all spanwise blade segments as shown. However, in the spanwise portion of the blade between radius $r_1$ and $r_2$, the blade chord $c_x$ is wider than the chord c of the remainder of the blade. Since the aerodynamic center of any blade section falls approximately at its quarter-chord point, the aerodynamic center line in the wide-chord portion of the blade may be displaced from the feathering axis a distance $d_x$. Therefore, the aerodynamic lift on this wide-chord portion of the blade, multiplied by this distance $d_x$ produces a feathering moment on the blade whenever the blade has a pitch angle $\theta_B$. This feathering moment is divergent if $d_x$ is positive and the wide chord portion of the blade projects forward of the blade leading edge as shown in FIG. 3, since it always acts in such a direction as to increase the blade pitch angle $\theta_B$. (It should be noted that aerodynamic lift on the remainder of the blade does not produce feathering moments because the aerodynamic center line coincides with the blade pitch-change axis in the remainder of the blade). The aerodynamic feathering moment which is proportional to feathering angle $\theta_B$ is given below (where a is non-dimensional lift curve slope of the blade airfoil).

$$\theta_B \Omega^2 (\rho/6) a c_x d_x [r_2^3 - r_1^3]$$

The restoring feathering moment from chordwise components of centrifugal force can be derived by reference to FIGS. 4 and 5. FIG. 4 is a plan view of the rotor blade which shows the incremental centrifugal force dCF that develops on each incremental blade element $dx_c$, dr when the rotor turns at angular velocity $\Omega$. This incremental force is a vector which lies along a line that passes through the center of the rotor hub. However, this incremental force vector can be resolved into a spanwise component $dCF_s$ and chordwise component $dCF_c$ as shown. FIG. 5 is a profile view of the blade through the section at blade radius r. The incremental chordwise component of centrifugal force $dCF_c$ which develops on incremental blade element $dx_c$, dr is always parallel to the plane of rotation of the rotor as shown. Therefore, since this blade element is separated from the blade pitch-change axis by a chordwise distance $x_c$, the following incremental restoring moment is produced by $dCF_c$ whenever the blade has a feathering pitch angle $\theta_B$:

$$dCF_c x_c \theta_B$$

When these incremental feathering moments are integrated over the entire planview area of the rotor blade, the total restoring moment about the pitch-change axis from chordwise components of centrifugal force is obtained as follows (where $M_B$ is blade mass).

$$\theta_B \Omega^2 M_B (c^2/16)$$

In this expression, the quantity $M_B c^2/16$ is identical to the expression for feathering moment of inertia $I_B$ of a rotor blade which balances about its quarter-chord line. Therefore, the restoring moment from chordwise components of centrifugal force which is proportional to blade feathering angle is simply $$\theta_B \Omega^2 I_B$$

Combining the expression for aerodynamic feathering moment and this expression for feathering moment from centrifugal force, the net effective feathering spring constant is obtained as follows:

$$K_B = \Omega^2 (I_B - (\rho/6) a c_x d_x [r_2^3 - r_1^3])$$

For this spring constant to be a positive real number it is necessary that;

$$I_B > (\rho/6) a c_x d_x [r_2^3 - r_1^3]$$

Substituting the above expression for $K_B$ into the equation for blade natural feathering frequency and rearranging terms gives the following equation for the ratio of rotor frequency to blade natural feathering frequency:

$$\frac{\Omega}{\omega_n} = \sqrt{\frac{I_B}{\left( I_B - \frac{\rho}{6} a c_x d_x [r_2^3 - r_1^3] \right)}}$$

Figure 6:
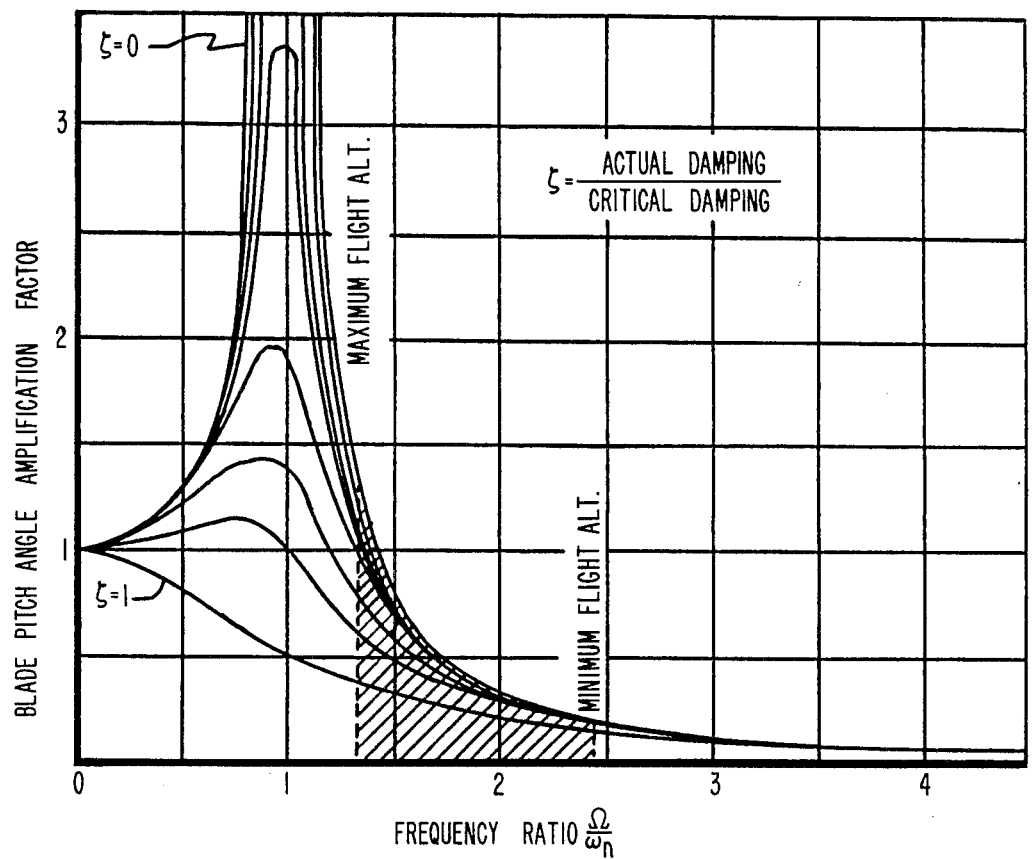
FIG. 6 is an amplitude-frequency diagram for feathering motion of one rotor blade of the self-feathering rotary wing.
Figure 7:
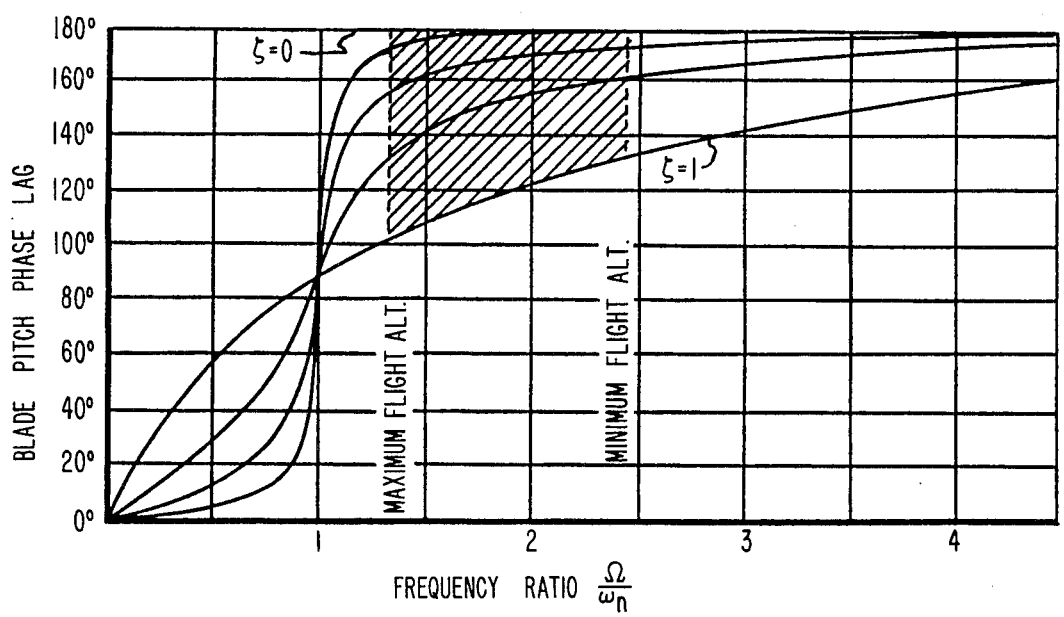
FIG. 7 is a phase angle-frequency diagram for feathering motion of one rotor blade of the self-feathering rotary wing.

The design parameters in this equation are chosen so that the self-feathering rotor blade operates in the shaded regions of the amplitude-frequency diagram of FIG. 6 and the phase angle-frequency diagram of FIG. 7. This frequency ratio will have its minimum value at the highest flight altitude and will have its maximum value at minimum flight altitude. As shown in FIG. 6, to prevent excessive blade pitch angle amplification under these conditions it is desirable to make the minimum value of the frequency ratio;

$$\frac{\Omega}{\omega_n} \geq \sqrt{2}$$

Substituting this value into the equation for frequency ratio and algebraically re-arranging terms, the following criteria must be satisfied for the self-feathering rotary wing:

$$I_B > \frac{\rho}{6} a c_x d_x [r_2^3 - r_1^3] \geq \frac{I_B}{2}$$

In a self-feathering rotary wing which is constructed in accordance with this invention, torsional damping of blade feathering motion is negligible. Therefore, only the curves labeled $\zeta = 0$ in FIGS. 6 and 7 are applicable. From FIG. 7 it is clear that when the rotor blade is operating in the shaded region with zero damping, the blade pitch phase angle is 180°. In a helicopter rotor this is one half revolution of the rotor. This means that when a rotor blade of the self-feathering rotor is subjected to a cyclic feathering moment which repeats once-per-revolution of the rotor, the resulting cyclic blade feathering displacement will lag one half revolution of the rotor behind the feathering moment.

Figure 8:
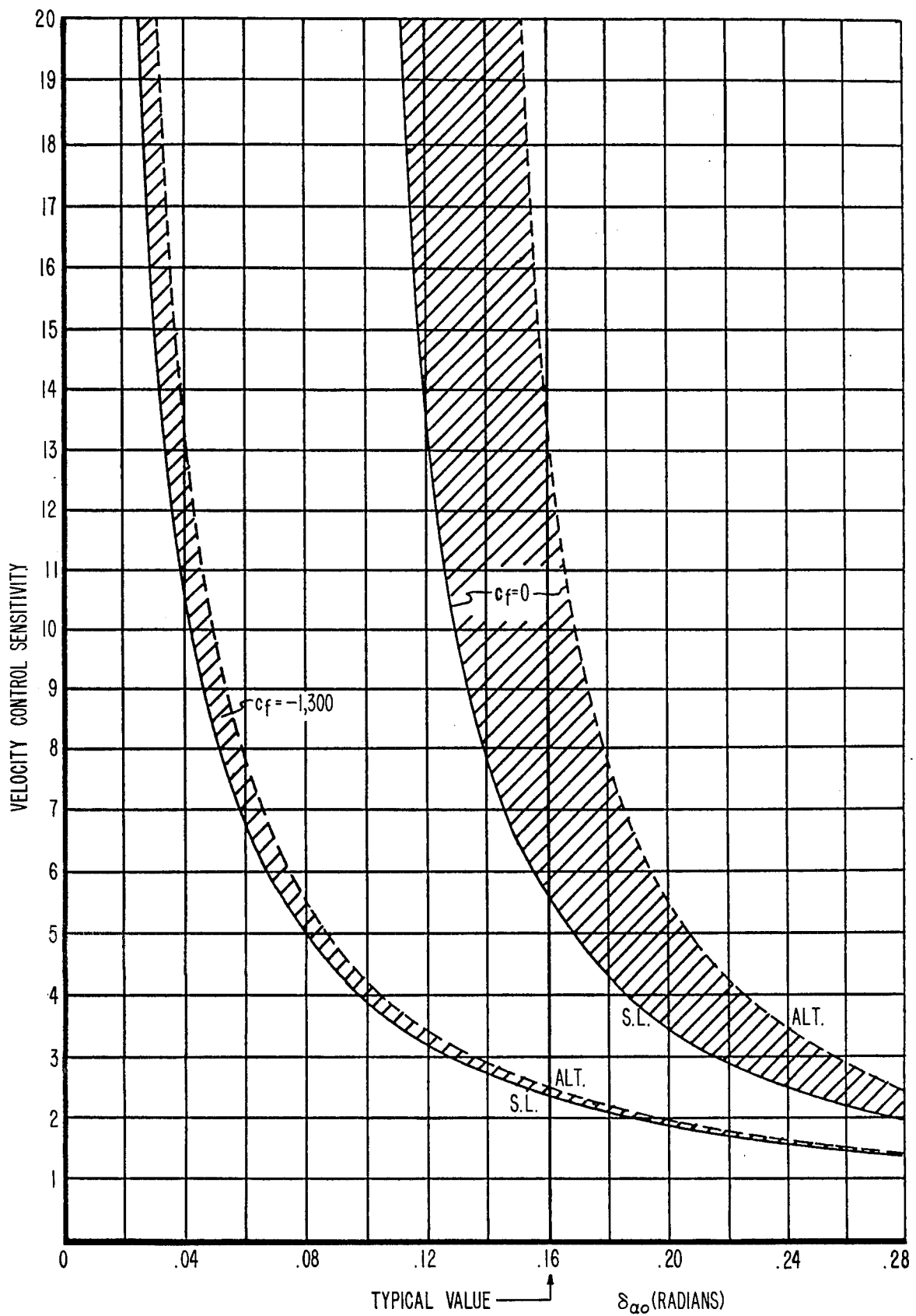
FIG. 8 is a plot showing the relationship between velocity control sensitivity and average control aileron deflection in the self-feathering rotary wing for two values of flapping hinge damping.

Velocity control sensitivity for a helicopter fitted with the self-feathering rotary wing is the change in aircraft translational velocity which results from a cyclic deflection of the control ailerons. In the self-feathering rotary wing, this velocity control sensitivity is dependent on the average setting of the control ailerons $\delta_{ao}$. The curves in FIG. 8 show how the velocity control sensitivity varies with average aileron setting. The curve labeled $c_f = 0$ is for a self-feathering rotary wing having no damping on the flapping hinges and the curve labeled $c_f = -1,300$ has a substantial amount of damping on the flapping hinges. It should be noted that for both curves, if the average setting of the control ailerons approaches zero, velocity control sensitivity becomes infinite. On the other hand, if a large average aileron setting is employed, velocity control sensitivity becomes too small to be practical. An acceptable value of $\delta_{ao}$ which falls between these two extremes is indicated in FIG. 8. These curves show that the control ailerons of the self-feathering rotary wing should be rigged to oscillate cyclically about some finite average value to produce an appropriate velocity control sensitivity.

FIG. 8 also shows that velocity control sensitivity of the self-feathering rotary wing is quite sensitive to changes in the average aileron deflection $\delta_{ao}$. Therefore, an alternative configuration provides each rotor blade with a fixed incidence trim tab (18 in FIG. 1) which is separate from the cyclic pitch control aileron. The incidence angle of this trim tab can be precisely set and locked before flight. If such a trim tab is used, the cyclic control ailerons can be rigged so they oscillate about an average incidence angle of zero degrees relative to the zero-lift chord line of the rotor blade. Those skilled in the art of aerodynamics will recognize that a rotor blade which is fitted with such a fixed-incidence trim tab is aerodynamically equivalent to a rotor blade which has no trim tab but which has a cambered airfoil section over at least part of its span. Therefore, a second alternative is to omit the fixed-incidence trim tab and to employ a cambered airfoil section over a portion of the rotor blade span.

The self-feathering rotary wing has unique stability characteristics in flight. These stability characteristics can be best understood by comparing behaviour of the self-feathering rotary wing with a conventional rotary wing. FIG. 9 shows a helicopter fitted with a conventional rotary wing in equilibrium flight at the instant when a disturbance occurs. This disturbance may be a sudden change in the angle $\Delta \alpha$ between the external relative wind and the rotor tip-path plane for example. This disturbance produces incremental upward forces on the advancing blade at azimuth angle $\psi_1$ which are represented by the vector $F_1$ in FIG. 9. Conversely, the disturbance also produces incremental downward forces on the retreating blade at azimuth angle $\psi_3$ which are represented by the vector $F_3$ in FIG. 9. These incremental forces produce lateral flapping moments on the blades of the conventional rotary wing. These lateral flapping moments in turn produce longitudinal flapping displacements 90° later in the rotor's arc causing the rotor plane to tilt toward the rear as indicated by the dashed ellipse in FIG. 10. This effectively increases the magnitude of the original disturbance to $\Delta\alpha'$ which in turn increases the magnitude of the incremental forces to $F_1'$ and $F_3'$. This static instability leads to the dynamic instability which is characteristic of conventional helicopters.

FIG. 11 shows a helicopter equipped with the self-feathering rotary wing of this invention in equilibrium flight at the instant when a disturbance occurs. As was the case for the conventional rotary wing, such a disturbance produces incremental upward forces on the advancing blade at azimuth angle $\psi_1$ which are represented by the vector $F_1$ in FIG. 11. The disturbance also produces incremental downward forces on the retreating blade at azimuth angle $\psi_3$ which are represented by the vector $F_3$ in FIG. 11. In addition to these incremental forces, however, the forward extensions on the rotor blades of the self-feathering rotary wing also produce incremental aerodynamic feathering moments on the blades. As shown in FIG. 11 there is a nose-up moment $M_1$ on the advancing blade and a nose-down moment $M_3$ on the retreating blade.

As previously described, the design parameters of the self-feathering rotor blades are chosen so that the natural frequency of the blades in feathering oscillation is less than the rotational frequency of the rotor. However, the blades are forced to oscillate at rotor frequency. Therefore, since this causes the blades to oscillate above their natural frequency, the cyclic feathering moments which are developed on the blades of the self-feathering rotor produce cyclic feathering displacements which lag 180° behind the applied cyclic feathering moments. In the self-feathering rotary wing, this means that an incremental nose-up moment $M_1$ which is developed on the advancing blade when it is at position $\psi_1$ will not produce a corresponding nose-up displacement of that blade until it has progressed around the rotor arc one half revolution to position $\psi_3$. Conversely, an incremental nose-down moment $M_3$ which is developed on the retreating blade when it is in position $\psi_3$ will not produce a corresponding nose-down displacement of that blade until it has progressed around the rotor arc one half revolution to position $\psi_1$. The net result in the self-feathering rotor is that these cyclic blade feathering displacements effectively neutralize the original incremental forces $F_1$ and $F_3$ and eliminate the lateral blade flapping moments which these would normally produce. The self-feathering rotor therefore continues to rotate in its original plane in spite of the disturbance as shown in FIG. 12.

The version of the self-feathering rotary wing which is shown in FIG. 1 has cyclic pitch controlled by ailerons mounted on the trailing edges of the rotor blades. This allows cyclic pitch displacement to lag 180° (or one half revolution of the rotor) behind applied cyclic control moments as previously described. However, it is possible to control cyclic pitch of the rotor blades of the self-feathering rotary wing through a conventional cyclic pitch control swashplate bearing assembly provided that the control means which tilt the swashplate are so designed that the swashplate can respond by tilting in a direction opposite to the applied tilting moments imposed on it by the control system. Two alternative methods of cyclic pitch control for the self-feathering rotary wing which possess this capability are shown in FIGS. 13 and 14 and are described below.

It should be noted that the rotors having these alternative methods of cyclic pitch control are shown with four blades on the rotor. This construction is preferred because in a four blade rotor, the algebraic sum of cyclic first harmonic feedback forces imposed by the blades onto the cyclic pitch control swashplate is constant and is therefore independent of the azimuth position of the rotor. This avoids wobble of the swashplate as the rotor turns while the swashplate is tilted.

Figure 13:
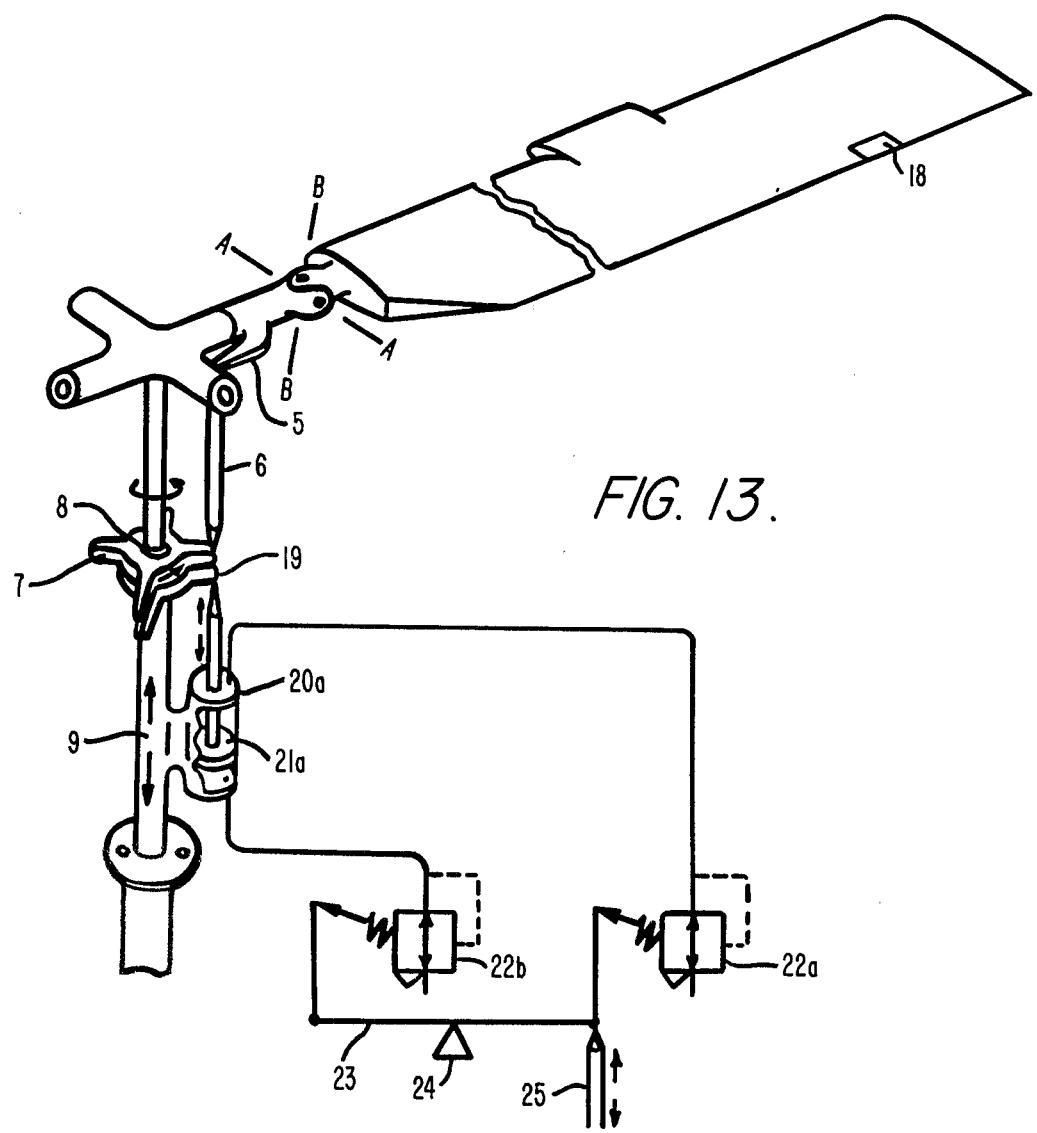
FIG. 13 is a pictorial view of an alternate embodiment of the invention wherein the self-feathering rotor blade has cyclic pitch control provided by mechanical actuators.
Figure 14:
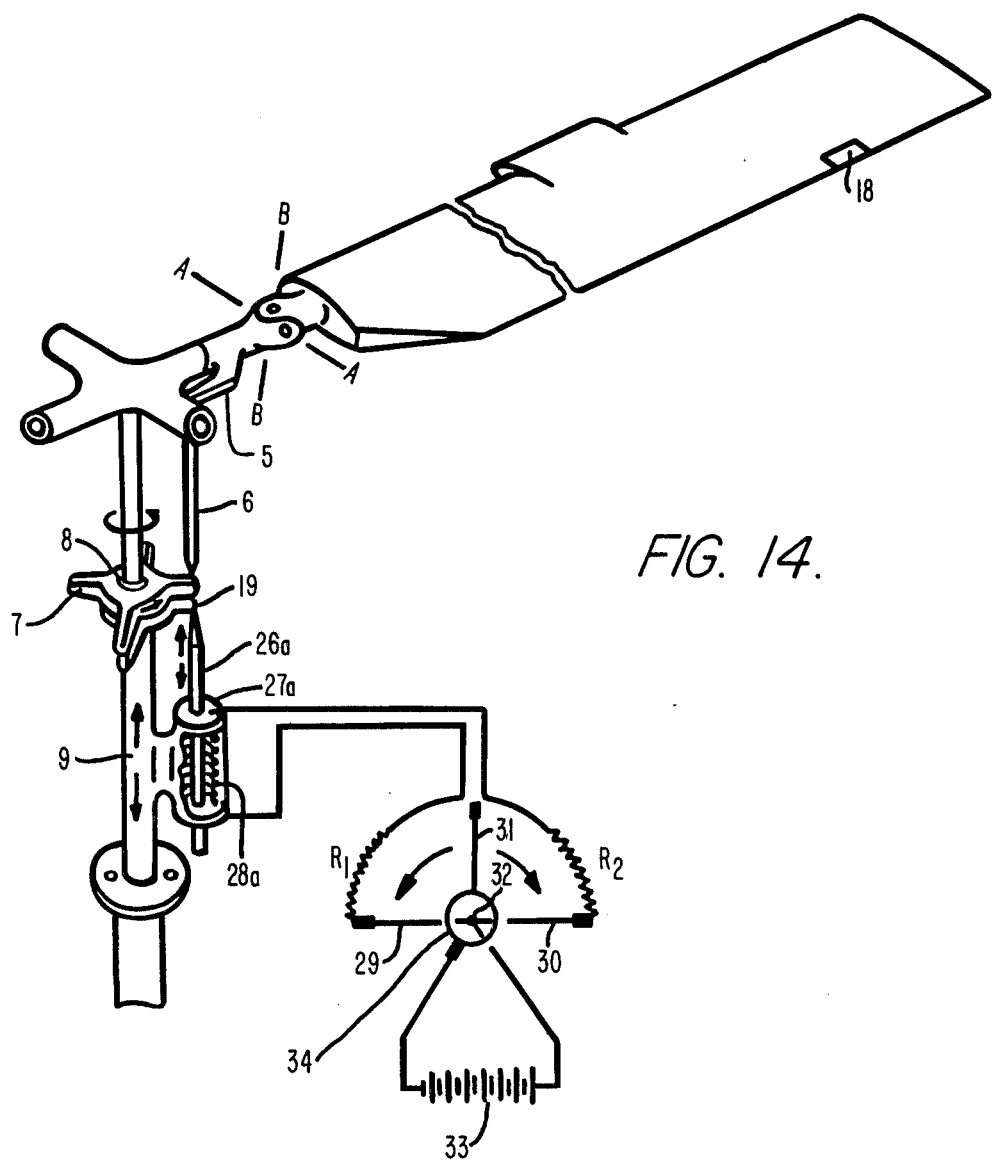
FIG. 14 is a pictorial view of an alternate embodiment of the invention wherein the self-feathering rotor blade has cyclic pitch control provided by electric actuators.

A first alternative embodiment of the self-feathering rotary wing with a cyclic pitch control swashplate is shown in FIG. 13. This rotary wing is similar to the embodiment previously described except that control of cyclic pitch is accomplished by mechanical actuators and a swashplate instead of ailerons. Working fluid used in these actuators may be either compressed air or liquid. (Trim tabs 18 are installed on this embodiment of the self-feathering rotary wing to satisfy the velocity control criteria but they are ground-adjustable only and are not under the control of the pilot during flight). In this version of the self-feathering rotary wing, a non-rotating portion 19 is added to swashplate 7. This entire swashplate bearing assembly is universally mounted to the end of slidable tube 9 through spherical bearing 8. The non-rotating portion 19 of this swashplate assembly has two radial arms projecting at right angles to each other, each of which is connected at its outer end to a mechanical control actuator 20a,b. For clarity of illustration, only one of these actuators (20a) is shown in FIG. 13. These actuators' cylinders are mounted through radial support arms to slidable tube 9. Each of these cylinders has a single piston 21a,b inside and means are provided to separately pressurize the interior cavities of the cylinder on opposite sides of this piston. Each of these cavities is pressurized by a separate pressure regulating valve 22a,b. These pressure regulating valves (which are shown schematically in FIG. 13) are of the "relieving" type. Such valves maintain a preset pressure at their outlet regardless of whether external influences tend to increase this pressure or decrease it. The controls of pressure regulating valves 22a and 22b are interconnected through rocking beam 23 which pivots about fulcrum 24 located at its center. Tilt of this beam is controlled by the pilot through control link 25. Thus when rocking beam 23 is tilted by the pilot, it causes pressure regulator valves 22a and 22b to produce equal and opposite pressure changes in the two cavities of control cylinder 20a. This in turn produces an unbalanced force on piston 21a which tends to tilt the swashplate about spherical bearing 8. This tilting force is transmitted through pitch links 6 and control horns 5 and produces cyclic feathering moments on the blades as the rotor turns.

As previously described, cyclic feathering displacement of the self-feathering rotor blades lags one half revolution of the rotor behind cyclic feathering moments. This phase lag can be accomodated by the cyclic control mechanism shown in FIG. 13 because pistons 21a,b are free to move axially within cylinders 20a,b. Also, the relieving type pressure regulators specified maintain the preset pressures on both sides of the piston regardless of the piston's axial position within the cylinder.

A second alternative embodiment of the self-feathering rotary wing with a cyclic pitch control swashplate is shown in FIG. 14. This rotary wing is similar to the embodiment previously described except that control of cyclic pitch is accomplished by electrical actuators. In this version of the self-feathering rotary wing, the non-rotating portion 19 of the swashplate assembly has two radial arms projecting at right angles to each other, each of which is connected at its outer end to the moveable core rod 26a,b of an electrical solenoid 27a,b. For clarity of illustration, only one of these solenoids (27a) is shown in FIG. 14. Each of these solenoids consists of an axially moveable core rod 26a,b surrounded by a coil of electrically conductive wire 28a,b. These solenoids are mounted through radial support arms to slidable tube 9.

Each of these solenoids is controlled by a combination rotary switch and double rheostat as shown in FIG. 14. This electrical control system is shown schematically and is intended to be representative of all equivalent types of control systems that might be employed. In the control system shown, the rotary switch has three mutually perpendicular contact arms 29, 30 and 31 all of which maintain thus relative orientation while they rotate about a common center pivot. Their angular position about this central pivot is set by the pilot. Contact arms 29 and 30 are 180° apart and have a slip ring 32 at their center which is connected to one end of a direct current power supply. (This power supply is represented schematically as a battery 33 in FIG. 14). Contact arm 31 is mounted 90° from both contact arms 29 and 30 and has a slip ring 34 at its central pivot which is connected to the opposite end of the direct current power supply. The two resistors $R_1$ and $R_2$ are curved with their center of curvature coinciding with the central pivot of the contact arms so they always contact the ends of either arm 29 or 30 at all angular positions of the rotary switch. Similarly, contact arm 31 always contacts either one of the curved contact wires which extend from the ends of curved resistors $R_1$ and $R_2$.

With the rotary switch centered as shown in FIG. 14, the circuit is in its null position and no electrical current flows through the solenoid. However, if the rotary switch is rotated clockwise as indicated by the right hand curved arrow, current will flow through the left hand resistor and up through the solenoid coil producing an axial force on the moveable core rod of the solenoid. The farther the rotary switch is rotated in the clockwise direction, the larger the current flow will be because more of the left hand resistor is bypassed. Since axial force on the solenoid core rod is proportional to flow of current through the solenoid coil, the control force produced by the solenoid will be proportional to the angular displacement of the rotary switch. If the rotary switch is rotated counter-clockwise, the same result is achieved except that direction of current flow through the solenoid coil is reversed. Likewise, the axial control force on the solenoid core rod is reversed.

This solenoid will produce a tilting moment on the control swashplate which is proportional to the angular displacement of the rotary switch. However, the solenoid core rod is free-floating and can move axially within the solenoid. As a result, it can allow the swashplate to actually tilt in a direction opposite to the tilting moment which is applied to it by the solenoid. This makes it possible for the rotor blades to feather 180° out of phase with applied cyclic feathering moments as is required by the dynamic design of the self-feathering rotary wing.

Figure 15:
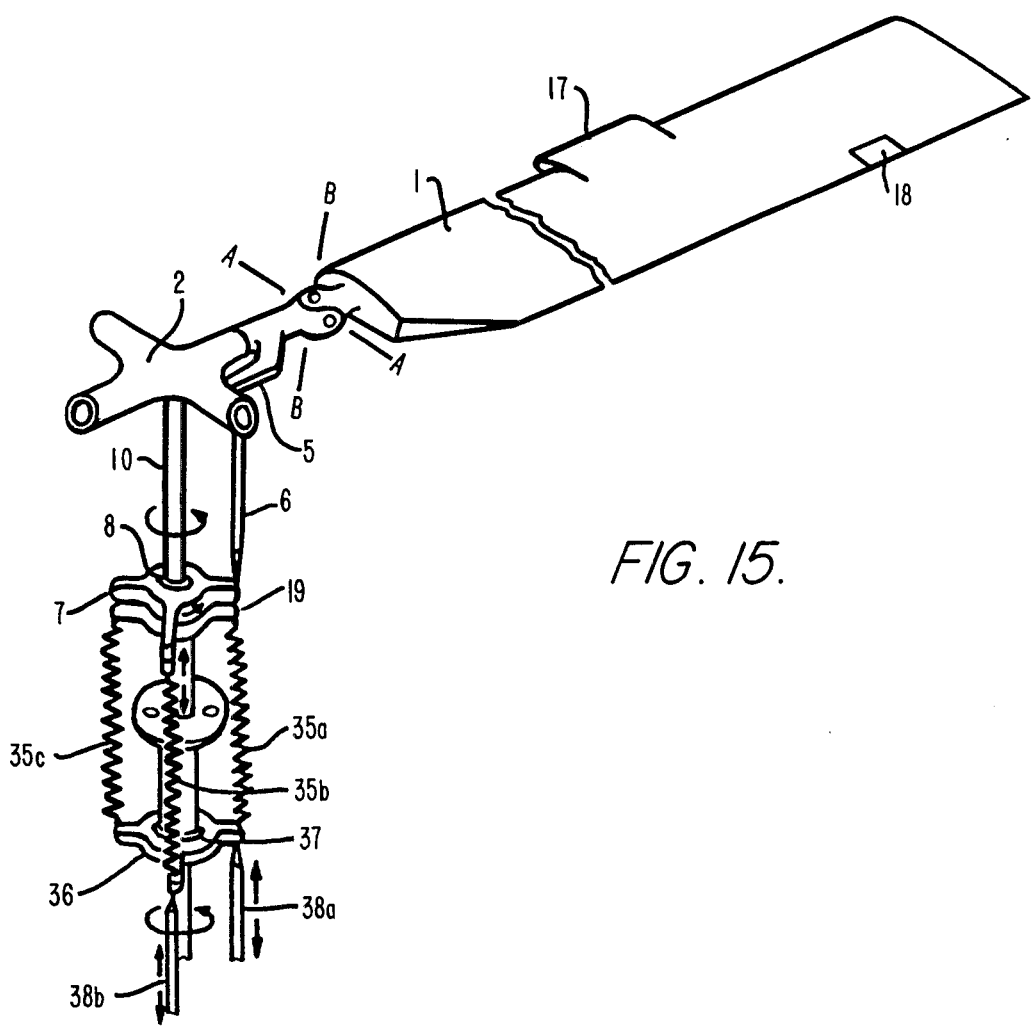
FIG. 15 is a pictorial view of the self-feathering rotary wing with cyclic pitch control provided by a swashplate which is tilted by springs.

A third alternative embodiment of the self-feathering rotary wing with a cyclic pitch control swashplate is shown in FIG. 15. This rotary wing is similar to the embodiments previously described except that control of cyclic pitch is accomplished through springs mounted in the control system. The non-rotating portion 19 of the previously described swashplate bearing assembly has a number of equally spaced, outward projecting radial arms, each of which is connected at its outer end to a spring 35a,b,c,d. Preferably, for rotors having more than two blades, the number of springs is equal to the number of blades on the lifting rotor. The opposite ends of these springs are connected to the outer ends of radial arms of a second swashplate 36. This swashplate does not rotate with the rotor and it does not move axially along the rotor shaft but it can tilt in any direction since it is mounted to a spherical bearing 37. Its angle of tilt is set by the pilot through push rods 38a,b which are controlled by a conventional cyclic pitch control mechanism (not shown in FIG. 15).

Swashplate 36 is shown in FIG. 15 as being mounted concentric with the rotor shaft. However, since this swashplate does not rotate with the rotor, it can be mounted in a location which is remote from the rotor if desired. For example, it can be mounted at the base of the pilot's cyclic pitch control stick and can be connected to springs 35a,b,c,d by control cables or pushpull linkages. In any case, the cyclic pitch control mechanism should be constructed so that it is irreversible. Such an irreversible mechanism is well known to those skilled in the art of aircraft control system design. An irreversible control mechanism can transmit pilot-induced forces to tilt the swashplate 36; however, rotor control feedback forces applied to this swashplate through springs 35a,b,c,d will not cause it to tilt because of the presence of the irreversible control system.

Pilot-controlled tilt of swashplate 36 produces differential axial forces in control springs 35a,b,c,d which in turn urge swashplate 19 to tilt. However, because the control springs are extensible, swashplate 19 can actually tilt in a direction opposite to the tilt of swashplate 36. This allows the rotor blades to change pitch cyclically 180° out of phase with applied control inputs as is required by the dynamic design of the self-feathering rotary wing.

As previously described, the effective feathering spring rate of a rotor blade can be modified by displacing the center of aerodynamic lift in the chordwise direction relative to the feathering axis. For example, in a rotor blade which is free to change pitch relative to the rotor hub, if the center of aerodynamic lift is located forward of the feathering axis over a portion of the blade span, the effective feathering spring rate is reduced and the natural feathering frequency of the rotor blade will be less than the rotational frequency of the rotor. For the present embodiment of the self-feathering rotary wing, spring effects of aerodynamic lift and centrifugal forces are identical to those derived for the first embodiment of the invention.

Since the cyclic pitch control mechanism which controls tilt of swashplate 36 is irreversible, this swashplate serves as a fixed attachment for the ends of control springs 35a,b,c,d. Therefore, the spring rates of these control springs add to the effective feathering spring rate of each rotor blade. The incremental feathering spring rate for one blade which results from the addition of the control springs may be designated $K^s$. When this incremental feathering spring rate is included, the total effective feathering spring constant for one blade becomes $$K_B = \Omega^2 \left( I_B + \frac{K_s}{\Omega^2} - \frac{\rho}{6} ac_x d_x [r_2^3 - r_1^3] \right)$$

For this spring constant to be a positive real number it is necessary that;

$$\left[ I_B + \frac{K_s}{\Omega^2} \right] > \frac{\rho}{6} ac_x d_x [r_2^3 - r_1^3]$$

Substituting the above expression for $K_B$ into the equation for blade natural feathering frequency and re-arranging terms gives the following equation for the ratio of rotor frequency to blade natural feathering frequency:

$$\frac{\Omega}{\omega_n} = \sqrt{\frac{I_B}{\left( I_B + \frac{K_s}{\Omega^2} - \frac{\rho}{6} ac_x d_x [r_2^3 - r_1^3] \right)}}$$

The design parameters in this equation are chosen so that the self-feathering rotor blade operates in the shaded regions of the amplitude-frequency diagram of FIG. 6 and the phase angle-frequency diagram of FIG. 7. This frequency ratio will have its minimum value at the highest flight altitude and will have its maximum value at minimum flight altitude. As shown in FIG. 6, to prevent excessive blade pitch angle amplification under these conditions it is desirable to make the minimum value of the frequency ratio;

$$\frac{\Omega}{\omega_n} \geq \sqrt{2}$$

Substituting this value into the equation for frequency ratio and algebraically re-arranging terms, the following criteria must be satisfied for the self-feathering rotary wing with springs in the cyclic pitch control system:

$$\left[ I_B + \frac{K_s}{\Omega^2} \right] > \frac{\rho}{6} ac_x d_x [r_2^3 - r_1^3] \geq \left[ \frac{I_B}{2} + \frac{K_s}{\Omega^2} \right]$$

Figure 16:
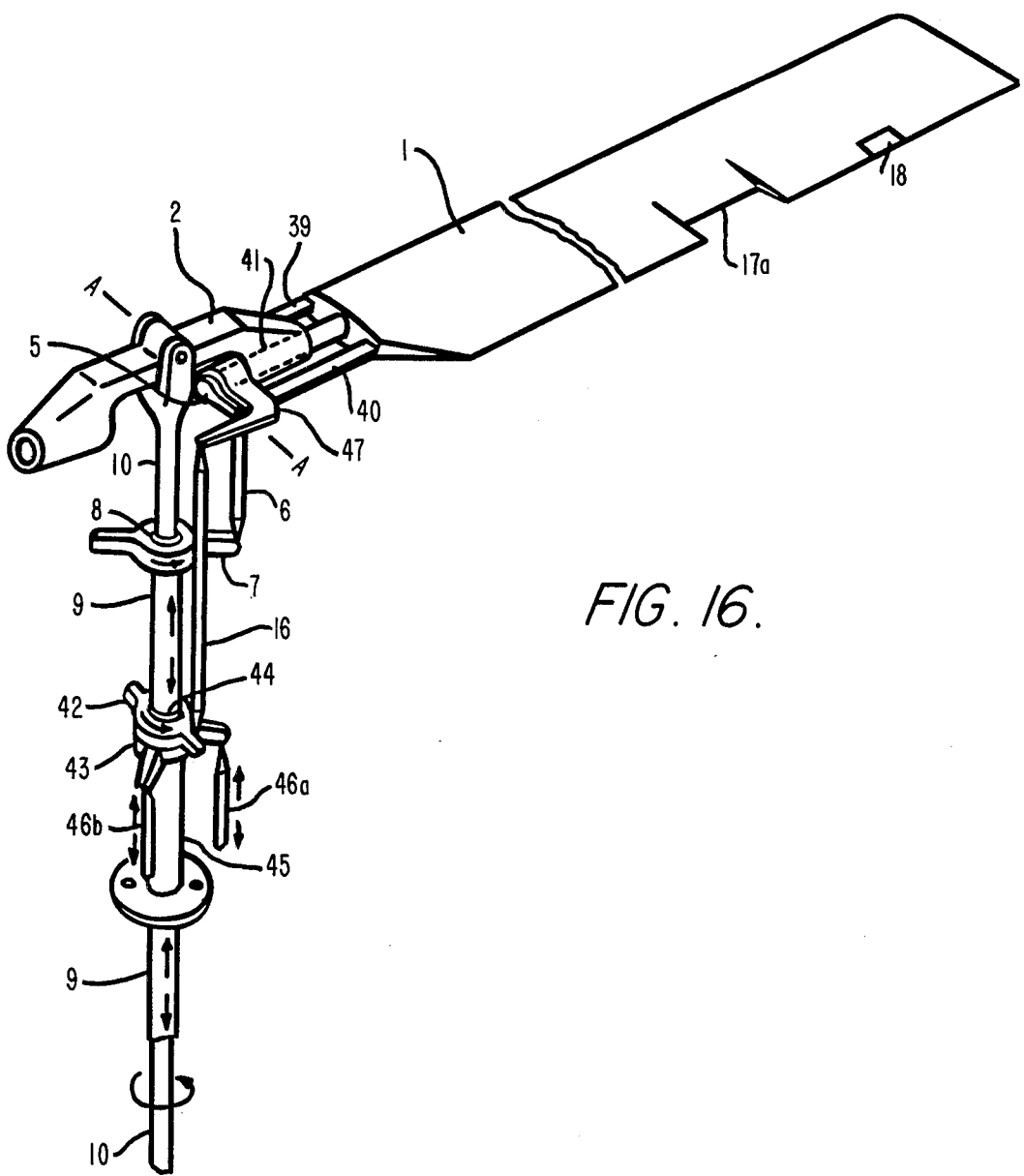
FIG. 16 is a pictorial view of the self-feathering rotary wing with cyclic pitch control inputs transmitted to the blades through radial torsion-tension straps.

A fourth alternative embodiment of the self-feathering rotary wing with a cyclic pitch control swashplate is shown in FIG. 16. However, in this version of the invention, cyclic pitch is controlled through radial torsion-tension straps 39 and 40 which are mounted between each blade 1 and a rocking crossbeam 47 which is mounted through bearings to the hub. This rotary wing may consist of any number of lifting rotor blades 1 attached to a common central hub 2. In FIG. 16 a two-bladed rotor is shown with one blade removed for clarity of illustration. As shown, central hub 2 is mounted to rotor shaft 10 by bearing means which allow the hub to rock relative to the shaft about chordwise axis A—A. Dampers may be installed on axis A—A to alter the dynamic characteristics of the aircraft. These dampers produce a restraining moment on blade flapping which is proportional to blade flapping velocity.

In the self-feathering rotary wing the feathering axis of each hub arm coincides with the quarter-chord line of the blade so that the blade changes pitch about its quarter-chord line. To allow each blade to change pitch relative to the hub, each blade is mounted to a corresponding hub arm by axially slidable journal bearing means as indicated schematically by dashed lines 41. To control pitch angle of all rotor blades collectively, a pitch control horn 5 is mounted to each blade root extension. Pin-ended pitch links 6 are connected by universal bearing means to pitch horns 5 and to radial arms of swashplate 7. The lengths of these pitch links are typically adjustable to effect blade tracking. The collective control swashplate 7 is driven to rotate with the rotor shaft as shown by the curved arrow but it is universally mounted through spherical bearing 8 to a sliding tube 9 which is coaxial with rotor shaft 10. This tube can be moved axially along the rotor shaft as indicated by the arrows. The axial position of this sliding collective pitch control tube is set by the pilot through a conventional collective pitch control mechanism (not shown in FIG. 16). When this slidable tube is moved axially as shown by the arrows, this motion is transmitted through the collective pitch swashplate to cause all blades to change pitch collectively. On the other hand, since the collective pitch control swashplate 7 is universally mounted, the blades are free to change pitch cyclically once per revolution of the rotor relative to the average pitch setting established by the collective pitch control mechanism.

Cyclic pitch of the self-feathering rotor blade in FIG. 16 is controlled by a second swashplate which includes a rotating portion 42 and a non-rotating portion 43 as shown. This cyclic pitch control swashplate is mounted through spherical bearing 44 to a fixed tube 45 which is coaxial with rotor shaft 10. This swashplate therefore has no axial movement but it can be tilted in any direction by pilot-actuated control links 46a and 46b. These control links are connected to a conventional irreversible cyclic pitch control mechanism (not shown in FIG. 16). The rotating portion 42 of this cyclic control swashplate is driven to rotate with the rotor driveshaft as shown by the curved arrow. The radial arms of this rotating portion 42 are each universally connected through a pin-ended pitch link 16 to one end of a rocking crossbeam 47 which is mounted through thrust bearing means to hub 2. This rocking beam can oscillate cyclically relative to the blade pitch-change axis. Chordwise extensions on this rocking crossbeam are connected to the root end of the rotor blade by radial torsion-tension straps 39 and 40. Since the cylindrical blade root extension is free to slide radially through the journal bearings which mount it to the rotor hub, the total centrifugal force on the rotor blade is reacted by these radial torsion-tension straps.

These radial torsion-tension straps typically consist of two approximately parallel bundles of straps placed equal distances on either side of the blade pitch-change axis. The ends of the straps may be either rigidly mounted or mounted through bearing means. In any case, the blade mounted to these straps constitutes a bifilar pendulum in the centrifugal force field when the rotor is turning since the blade can oscillate about its pitch-change axis. Since the straps are free to deflect and twist in this manner, they constitute an additional feathering spring between the blade and the rocking crossbeam. Therefore, they can transmit feathering control moments to the blade. The rocking beam 47, which is mounted to hub 2 by bearings, is forced to oscillate in a rocking motion at rotor frequency whenever the cyclic pitch swashplate is tilted by the pilot. However, in the self-feathering rotary wing, this frequency is higher than the natural feathering frequency of the self-feathering rotor blade blade on its mounting. Therefore, the blade will respond by oscillating in pitch 180° out of phase with cyclic oscillation of the rocking crossbeam whenever the cyclic pitch control swashplate is tilted. This out-of-phase feathering motion is accomodated by twist and/or flexure of the radial torsion-tension straps 39, 40.

As previously described, the effective feathering spring rate of a rotor blade can be modified by displacing the center of aerodynamic lift in the chordwise direction relative to the feathering axis. For example, in a rotor blade which is free to change pitch relative to the rotor hub, if the center of aerodynamic lift is located forward of the feathering axis over a portion of the blade span, the effective feathering spring rate is reduced and the natural feathering frequency of the rotor blade will be less than the rotational frequency of the rotor. For the present version of the self-feathering rotary wing, spring effects of aerodynamic lift and centrifugal force are identical to those previously derived for the first embodiment of the invention. However, when radial torsion-tension straps 39, 40 are employed to mount a lifting rotor blade as shown in FIG. 16, centrifugal force developed on the blade when the rotor is turning produces a restoring moment about the blade pitch-change axis which contributes to the effective spring constant of the blade mounting since this moment is dependent on blade feathering angle but is independent of blade azimuth position. When the blade has a feathering angle $\theta_B$ relative to the hub the retention strap assemblies may be deflected and twisted. The resulting forces are shown in the schematic perspective diagram of FIG. 17.

When the blade changes pitch and deflects the torsion-tension straps, centrifugal force on the rotor blade tends to straighten the straps urging blade pitch angle $\theta_B$ to decrease. If the mass of the blades per unit of radius is $M_B/R$, the total centrifugal force on one blade when the rotor is turning at angular velocity $\Omega$ is:

$$\Omega^2 \frac{M_B}{R} \int_0^R r\,dr = \Omega^2 M_B \frac{R}{2}$$

Figure 17:
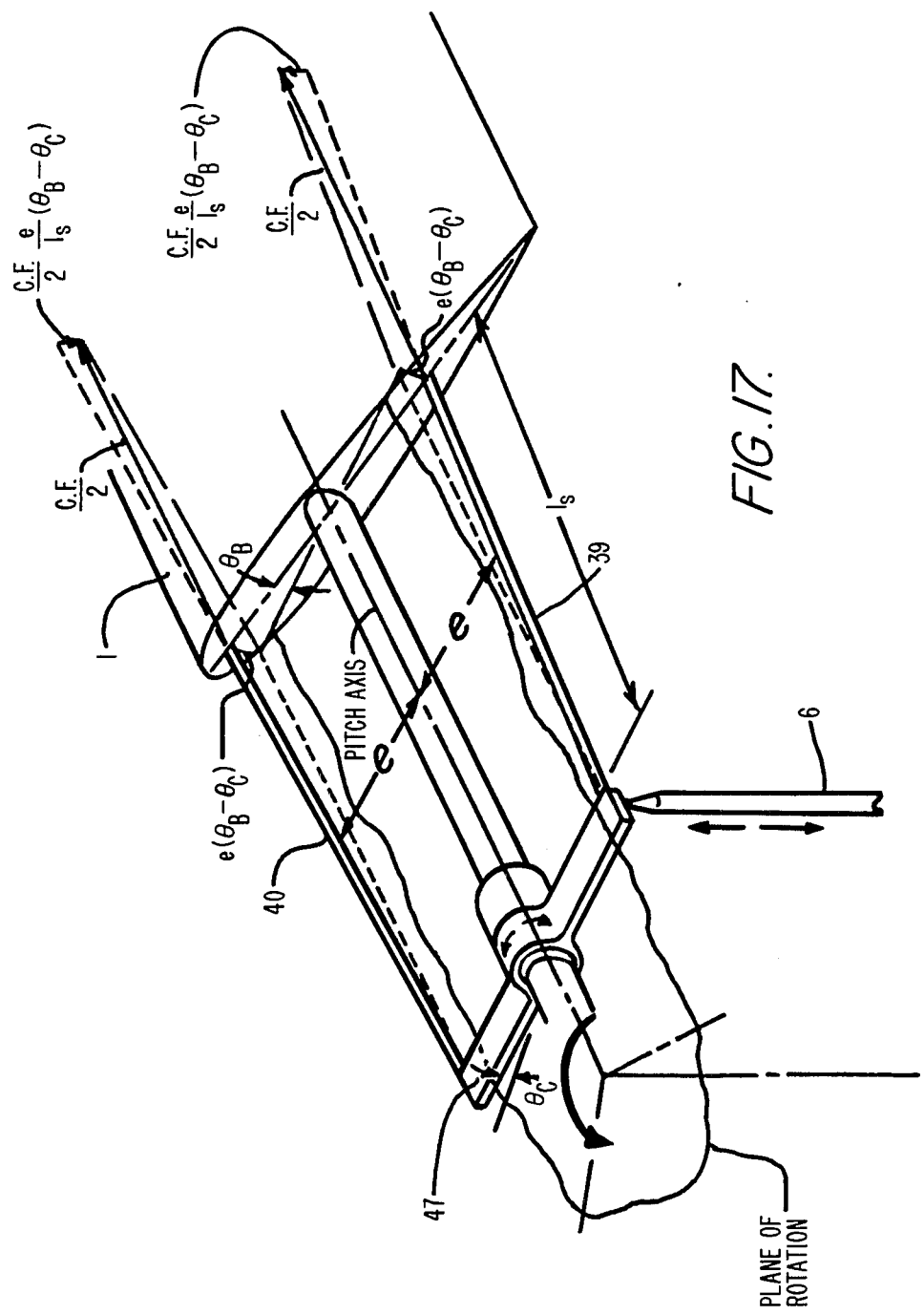
FIG. 17 is a schematic perspective view of torsion-tension straps to react centrifugal forces on one rotor blade.

From the diagram of FIG. 17, the restoring moment about the blade pitch-change axis which arises from centrifugal forces on the torsion-tension straps is:

$$(C.F.) \frac{e^2}{l_s} (\theta_B - \theta_C)$$

Substituting the above expression for centrifugal force this becomes:

$$\Omega^2 \frac{M_B}{2} \frac{R}{l_s} e^2 (\theta_B - \theta_C)$$

In addition to this restoring moment on the blade which arises from the effects of spanwise centrifugal forces on the torsion-tension straps, each of these straps may be twisted when the blade changes pitch relative to the hub arm. Each torsion-tension strap has elastic stiffness so it acts as a restoring spring about the blade pitch-change axis when it is twisted. If the length of each torsion-tension strap is $l_s$ and assuming that there are a total of $n_s$ individual flat straps each with width $b_s$ and thickness $t_s$, the restoring moment which arises from twist of the torsion-tension straps is given by the following expression:

$$n_s \frac{b_s}{l_s} \frac{t_s^3}{3} G(\theta_B - \theta_C)$$

(Where G is the shearing modulus of elasticity of the material from which the torsion-tension straps are made.)

Combining the two expressions for restoring spring moments due to the torsion-tension straps gives the feathering spring constant due to the straps as follows:

$$K_f = \frac{M_B}{2} \frac{R}{l_s} e^2 + n_s \frac{b_s}{l_s} \frac{t_s^3}{3} \frac{G}{\Omega^2}$$

Combining the expressions for aerodynamic feathering moment and restoring moment due to chordwise components of centrifugal force, with this expression for restoring moment from the torsion-tension straps gives the net effective feathering spring constant as follows:

$$K_B = \Omega^2 \left( I_B + K_f - \frac{\rho}{6} ac_x d_x [r_2^3 - r_1^3] \right)$$

For this spring constant to be a positive real number it is necessary that;

$$[I_B + K_f] > \frac{\rho}{6} ac_x d_x [r_2^3 - r_1^3]$$

Substituting the above expression for $K_B$ into the equation for blade natural feathering frequency and re-arranging terms gives the following equation for the ratio of rotor frequency to blade natural feathering frequency:

$$\frac{\Omega}{\omega_n} = \sqrt{\frac{I_B}{\left( I_B + K_f - \frac{\rho}{6} ac_x d_x [r_2^3 - r_1^3] \right)}}$$

The design parameters in this equation are chosen so that the self-feathering rotor blade operates in the shaded regions of the amplitude-frequency diagram of FIG. 6 and the phase angle-frequency diagram of FIG. 7. This frequency ratio will have its minimum value at the highest flight altitude and will have its maximum value at minimum flight altitude. As shown in FIG. 6, to prevent excessive blade pitch angle amplification under these conditions it is desirable to make the minimum value of the frequency ratio;

$$\frac{\Omega}{\omega_n} \geq \sqrt{2}$$

Substituting this value into the equation for frequency ratio and algebraically re-arranging terms, the following criteria must be satisfied for the self-feathering rotary wing:

$$[I_B + K_f] > \frac{\rho}{6} a c_x d_x [r_2^3 - r_1^3] \geq \left[\frac{I_B}{2} + K_f\right]$$

It should be noted that the expression for $K_f$ derived above represents the general case where two bundles of torsion-tension straps are mounted an average distance e on either side of the blade pitch-change axis and the end mountings of the straps are such that the straps are twisted whenever the blade changes pitch. Certain variations of this general case can occur in practice without departing from the spirit and scope of the invention. For example, the two bundles of torsion-tension straps can be consolidated into a single bundle which is centered on the blade pitch-change axis. In such a case "e" becomes zero and the terms containing e disappear. On the other hand, if the ends of the torsion-tension straps are universally mounted (through spherical bearings for example) so the straps do not twist when the blade changes pitch, then the terms containing shear modulus of elasticity "G" disappear.

For purposes of illustration, the torsion-tension members are described herein as consisting of straps of rectangular cross-section with width $b_s$ and thickness $t_s$. However, one skilled in the art will recognize that straps of any equivalent cross-section can be substituted without departing from the spirit and scope of the invention. Also, for purposes of illustration, FIGS. 1, 13, 14 and 15 show the leading edge of a spanwise section of the self-feathering rotor blade (17) displaced forward of the leading edge of the remainder of the blade. As explained, this is done to place the aerodynamic center forward of the blade pitch-change axis in that portion of the blade. It will be obvious to aerodynamicists, however, that the same result can be obtained by displacing the trailing edge of such a section forward of the trailing edge of the remainder of the blade as is shown (17a) in FIG. 16. In either case, the relationships between blade design parameters which are specified in the claims apply with equal effect.

I claim:

1. A lifting rotary wing comprising;
   a hub mounted on a shaft, and
   a number of lifting rotor blades mounted to the radial arms of said hub by bearing means for feathering displacement about a spanwise pitch-change axis,
   Wherein
   said pitch-change axis of each lifting rotor blade is a first spanwise line in the blade which passes through the centers of gravity of all spanwise blade segments, and
   each blade has a second spanwise line which passes through the aerodynamic centers of all spanwise blade segments, said aerodynamic center line coinciding with said pitch-change axis except in a spanwise portion of the blade between radius $r_1$ and $r_2$ where the average chord is $c_x$ and the aerodynamic center line is located an average distance $d_x$ forward of the pitch-change axis, and
   moment of inertia of the blade $I_B$ measured about the blade pitch-change axis is related to the dimensions of said spanwise portion of the blade by the relationship $$I_B > \frac{\rho}{6} a c_x d_x [r_2^3 - r_1^3] \geq \frac{I_B}{2}$$

Where $\rho$ is air density at flight altitude and a is the non-dimensional lift curve slope of the blade airfoil, said combination of parameters producing a lifting rotor blade having natural feathering frequency lower than the speed of rotation of the rotor at all flight conditions, in which cyclic variations of aerodynamic lift produce cyclic feathering moments on the blade and resulting cyclic displacements in blade pitch lag behind said cyclic feathering moments by one half revolution of the rotor.

2. A lifting rotary wing as described in claim 1 including;
   a pitch horn rigidly attached to the root portion of each rotor blade,
   pin-ended links connected by universal bearing means to said pitch horns and to radial arms of a swashplate which is concentric with the rotor shaft,
   said swashplate driven by the rotor driveshaft and mounted universally to an axially moveable member which is concentric with the rotor shaft, and
   control means to change the axial position of said member for collective variation of blade pitch.

3. A lifting rotary wing having collective pitch control means as described in claim 2 wherein the length of each pin-ended link is adjustable to effect blade tracking.

4. A lifting rotary wing as described in claim 1 including;
   an aileron mounted on each rotor blade, said aileron connected by linkages to the rotating portion of a swashplate which is driven by the rotor driveshaft and is universally mounted to a fixed member which is concentric with the rotor shaft,
   wherein
   tilt of said swashplate in any direction by pilot control inputs effects a once-per-revolution cycle variation of aileron incidence angle relative to said rotor blade.

5. A lifting rotor blade having cyclic pitch control means as described in claim 4 wherein the length of each aileron control linkage is adjustable to set a finite average incidence angle between the aileron and the blade.

6. A lifting rotary wing as described in claim 1 wherein each rotor blade is attached to its respective arm of the hub by hinge means which allow the blade to flap in the beamwise direction relative to the hub.

7. A lifting rotary wing having hinge means as described in claim 6,
   said hinge means including damping means having a restraining flapping moment reaction proportional to flapping velocity.

8. A lifting rotary wing as described in claim 1 wherein each rotor blade is fitted with a trim tab mounted in the trailing portion of the blade,
   each said trim tab having a fixed incidence angle relative to the zero-lift chordline of the rotor blade.

9. A lifting rotary wing as described in claim 1 wherein each rotor blade has a cambered airfoil section over at least a portion of the blade span.

10. A lifting rotary wing as described in claim 1 wherein said bearing means for feathering displacement of said blades relative to said hub arms comprise thrust bearings mounted between each blade and its corresponding hub arm.

11. A lifting rotary wing as described in claim 2, said swashplate having a rotating portion and a non-rotating portion,
   control means to tilt said swashplate comprising mechanical actuators attached to the arms of said non-rotating portion, said mechanical actuators each comprising an axially moveable piston inside a closed cylinder,
   means for differentially pressurizing the interior cavities of said cylinder on opposite sides of said piston, said pressurizing means comprising a pressure regulating valve connected to each said cavity, and
   the controls of said valves interconnected through a differential linkage so that displacement of said linkage simultaneously increases pressure produced by one valve and decreases pressure produced by the other valve.

12. Pressure regulating valves as specified in claim 11, said valves being the relieving type.

13. Mechanical actuators as specified in claim 11 each comprising an axially moveable piston inside a closed cylinder,
   each said cylinder being mounted to the axially moveable member on which the swashplate is mounted.

14. A control mechanism as described in claim 11 wherein the working fluid is compressed air.

15. A control mechanism as described in claim 11 wherein the working fluid is pressurized liquid.

16. A control mechanism as described in claim 11 wherein angular displacement of said differential linkage is under the control of the pilot.

17. A lifting rotary wing as described in claim 2,
   said swashplate having a rotation portion and a non-rotating portion,
   control means to tilt said swashplate comprising electrical actuators attached to the arms of said non-rotating portion,
   said electrical actuators each comprising an axially moveable core rod inside of a conductive solenoid coil with means for controlling the direction and magnitude of electrical current flowing through said solenoid coil.

18. Electrical control means as specified in claim 17 comprising in combination, a rotary switch and double rheostat, wherein
   said rotary switch has three mutually perpendicular contact arms mounted to rotate about a common pivot at their center,
   the two contact arms located 180° apart connected electrically to a first rotary slipring and the third contact arm connected electrically to a second rotary slipring,
   said first rotary slipring connected electrically to one end of a direct current power supply and said second rotary slipring connected electrically to the opposite end of said direct current power supply;
   said double rheostat comprised of two curved conductors each having a resistive portion with their common center of curvature coinciding with the center pivot of the rotary switch so that each conductor is always in contact with at least one of said mutually perpendicular contact arms,
   one end of each curved conductor connected electrically to one end of said conductive coil in said solenoid.

19. Electrical actuators as specified in claim 17
   said actuators mounted to the axially moveable member on which the swashplate is mounted.

20. Electrical control means as described in claim 18 wherein angular position of said rotary switch is under the control of the pilot.

21. A lifting rotary wing comprising
   a hub mounted on a shaft,
   a number of lifting rotor blades mounted to radial arms of said hub by bearing mans for feathering displacement about a spanwise pitch-change axis, and
   elastic spring means for cyclic adjustment of blade pitch in sinusoidal manner once per revolution of the rotary wing,
Wherein
   said pitch-change axis of each lifting rotor blade is a first spanwise line in the blade which passes through the centers of gravity of all spanwise blade segments, and
   each blade has a second spanwise line which passes through the aerodynamic centers of all spanwise blade segments, said aerodynamic center line coinciding with said pitch-change axis except in a spanwise portion of the blade between radius $r_1$ and $r_2$ where the average chord is $c_x$ and the aerodynamic center line is located an average distance $d_x$ forward of the pitch-change axis, and
   moment of inertia of the blade $I_B$ measured about the blade pitch-change axis is related to the dimensions of said spanwise portion of the blade and feathering spring rate of the cyclic pitch control mechanism $K_s$ by the relationship $$\left[I_B + \frac{K_s}{\Omega^2}\right] > \frac{\rho}{6} ac_x d_x [r_2^3 - r_1^3] \geq \left[\frac{I_B}{2} + \frac{K_s}{\Omega^2}\right]$$

Where $\Omega$ is angular velocity of the rotary wing during flight, $\rho$ is air density at flight altitude and a is the non-dimensional lift curve slope of the blade airfoil, said combination of parameters producing a lifting rotor blade having natural feathering frequency lower than the speed of rotation of the rotor at all flight conditions, in which cyclic variations of aerodynamic lift produce cyclic feathering moments on the blade and resulting cyclic displacements in blade pitch lag behind said cyclic feathering moments by one half revolution of the rotor.

22. A lifting rotary wing as described in claim 21 including;
   a pitch horn rigidly attached to the root portion of each rotor blade,
   pin-ended links connected by universal bearing means to said pitch horns and to radial arms of a swashplate which is concentric with the rotor shaft,
   said swashplate driven by the rotor driveshaft and mounted universally to an axially moveable member which is concentric with the rotor shaft, and
   control means to change the axial position of said member for collective variation of blade pitch.

23. A lifting rotary wing having collective pitch control means as described in claim 22 wherein the length of each pin-ended link is adjustable to effect blade tracking.

24. A rotary wing having a first swashplate as described in claim 22, said swashplate having a rotating portion and a non-rotating portion, control means to tilt said swashplate comprising elastic springs connected between radially projecting arms of said non-rotating portion of said first swashplate and the ends of corresponding radial arms of a second, non-rotating, swashplate, said second swashplate universally mounted to structure of the aircraft for tilt in any direction relative to said structure, and irreversible pilot-actuated control means to tilt said second swashplate relative to said structure.

25. A first swashplate having a rotating portion and a non-rotating portion and a second swashplate having a non-rotating portion as described in claim 24, the two said non-rotating portions having elastic springs connected between corresponding radial arms equally spaced around their periphery, the number of said arms being equal to the number of blades on the lifting rotor.

26. A lifting rotary wing as described in claim 21 wherein each rotor blade is attached to its respective arm of the hub by hinge means which allow the blade to flap in the beamwise direction relative to the hub.

27. A lifting rotary wing having hinge means as described in claim 26, said hinge means including damping means having a restraining flapping moment reaction proportional to flapping velocity.

28. A lifting rotary wing as described in claim 21 wherein each rotor blade is fitted with a trim tab mounted in the trailing portion of the blade, each said trim tab having a fixed incidence angle relative to the zero-lift chordline of the rotor blade.

29. A lifting rotary wing as described in claim 21 wherein each rotor blade has a cambered airfoil section over at least a portion of the blade span.

30. A lifting rotary wing as described in claim 21 wherein said bearing means for feathering displacement of said blades relative to said hub arms comprise thrust bearings mounted between each blade and its corresponding hub arm.

31. A lifting rotary wing comprising;

a hub mounted on a shaft, a number of lifting rotor blades mounted to radial arms of said hub by axially slidable journal bearing means for feathering displacement about a spanwise pitch-change axis, and torsion-tension members which provide the total reaction to centrifugal force on each blade, Wherein said pitch-change axis of each lifting rotor blade is a first spanwise line in the blade which passes through the centers of gravity of all spanwise blade segments, and each blade has a second spanwise line which passes through the aerodynamic centers of all spanwise blade segments, said aerodynamic center line coinciding with said pitch-change axis except in a spanwise portion of the blade between radius $r_1$ and $r_2$ where the average blade chord is $c_x$ and the aerodynamic center line is located an average distance $d_x$ forward of the pitch-change axis, and moment of inertia of the blade $I_B$ measured about the blade pitch-change axis is related to the dimensions of said spanwise portion of the blade and the dynamic feathering spring rate of the blade mounting $K_f$ by the relationship $$[I_B + K_f] > \frac{\rho}{6} ac_x d_x [r_2^3 - r_1^3] \geq \left[\frac{I_B}{2} + K_f\right]$$

Where $\rho$ is air density at flight altitude and $a$ is non-dimensional lift curve slope of the blade airfoil, said combination of parameters producing a lifting rotor blade having natural feathering frequency lower than the speed of rotation of the rotor at all flight conditions, in which cyclic variations of aerodynamic lift produce cyclic feathering moments on the blade and resulting cyclic displacements in blade pitch lag behind said cyclic feathering moments by one half revolution of the rotor.

32. A lifting rotary wing as described in claim 31 wherein said blades each have mass $M_B$ and radius $R$ and said torsion-tension members comprise $n_s$ radial straps each of average width $b_s$, Length $l_s$ and thickness $t_s$ with shearing modulus of elasticity G, said straps spaced an average distance $e$ from said pitch-change axis, the dynamic feathering spring rate of said torsion-tension members being $$K_f = \frac{M_B}{2} \frac{R}{l_s} e^2 + n_s \frac{b_s}{l_s} \frac{t_s^3}{3} \frac{G}{\Omega^2}$$

Where $\Omega$ is angular velocity of the rotary wing during flight.

33. A lifting rotary wing as described in claim 31 wherein said torsion-tension members comprise $n_s$ radial straps each of average width $b_s$, length $l_s$ and thickness $t_s$ with shearing modulus of elasticity G, said straps coincident with the blade pitch-change axis, the dynamic feathering spring rate of said torsion-tension members being $$K_f = n_s \frac{b_s}{l_s} \frac{t_s^3}{3} \frac{G}{\Omega^2}$$

Where $\Omega$ is angular velocity of the rotary wing during flight.

34. A lifting rotary wing as described in claim 31 wherein said torsion-tension members are spaced an average distance $e$ from the blade pitch-change axis and are attached at their ends by universal bearing means, the dynamic feathering spring rate of said torsion-tension members being $$K_f = \frac{M_B}{2} \frac{R}{l_s} e^2$$

35. A lifting rotary wing as described in claim 31 including;

a pitch horn rigidly attached to the root portion of each rotor blade, pin-ended links connected by universal bearing means to said pitch horns and to radial arms of a swashplate which is concentric with the rotor shaft, said swashplate driven by the rotor driveshaft and mounted universally to an axially moveable member which is concentric with the rotor shaft, and control means to change the axial position of said member for collective variation of blade pitch.

36. A lifting rotary wing having collective pitch control means as described in claim 35 wherein the length of each pin-ended link is adjustable to effect blade tracking.

37. A lifting rotary wing as described in claim 31 wherein said radial torsion-tension members connect each blade to a crossbeam mounted by bearing means to said hub for rocking displacement about the pitch-change axis of said blade,
- pin-ended links connected by universal bearing means to at least one extremity of said rocking beam and to a corresponding radial arm of a swashplate which is concentric with the rotor shaft,
- said swashplate driven by the rotor driveshaft and mounted universally to a fixed member which is concentric with the rotor shaft, and
- irreversible pilot actuated control means to tilt said swashplate.

38. A lifting rotary wing as described in claim 37 wherein said mounting of each said rocking beam to said hub includes thrust bearing means.

39. A lifting rotary wing as described in claim 31 wherein the blade mounting includes chordwise hinge means for beamwise flapping of the rotor blades.

40. A lifting rotary wing having hinge means as described in claim 39,
- said hinge means including damping means having a restraining flapping moment reaction proportional to flapping velocity.

41. A lifting rotary wing as described in claim 31 wherein each rotor blade is fitted with a trim tab mounted in the trailing portion of the blade,
- each said trim tab having a fixed incidence angle relative to the zero-lift chordline of the rotor blade.

42. A lifting rotary wing as described in claim 31 wherein each rotor blade has a cambered airfoil section over at least a portion of the blade span.

* * * * *

UNITED STATES PATENT AND TRADEMARK OFFICE
CERTIFICATE OF CORRECTION

PATENT NO. : 4,789,305

DATED : Dec. 6, 1988

INVENTOR(S) : Jack F. Baughen

It is certified that error appears in the above-identified patent and that said Letters Patent is hereby corrected as shown below:

Column 11, line 16, "thus" should be --this--.

Column 12, line 65, "$K^S$" should be --$K_s$--.

Column 19, line 36, "rotation" should be --rotating--.

Column 20, line 10, "mans" should be --means--.

Column 20, line 65, "adjutable" should be --adjustable--.

Signed and Sealed this

Second Day of May, 1989

*Attest:*

DONALD J. QUIGG

*Attesting Officer*   *Commissioner of Patents and Trademarks*